Figures 3, 4:
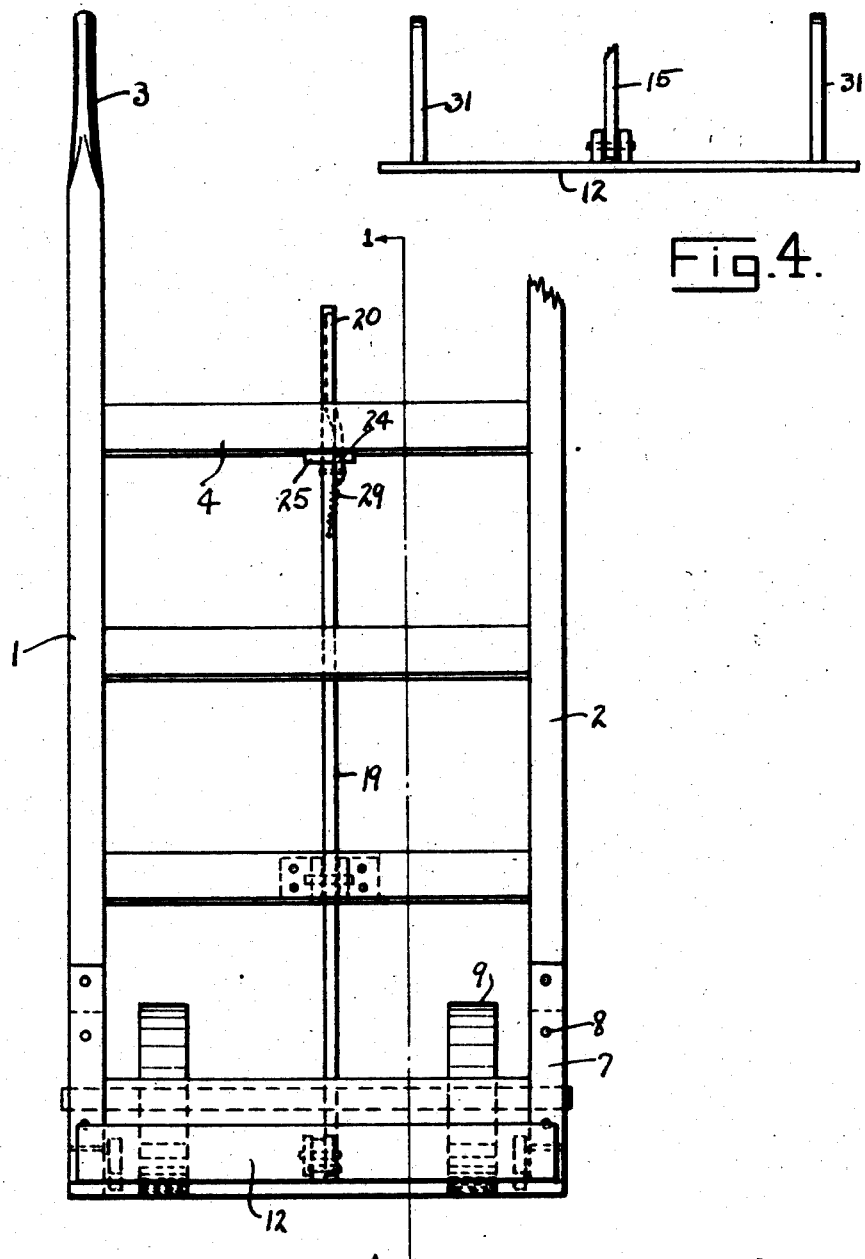

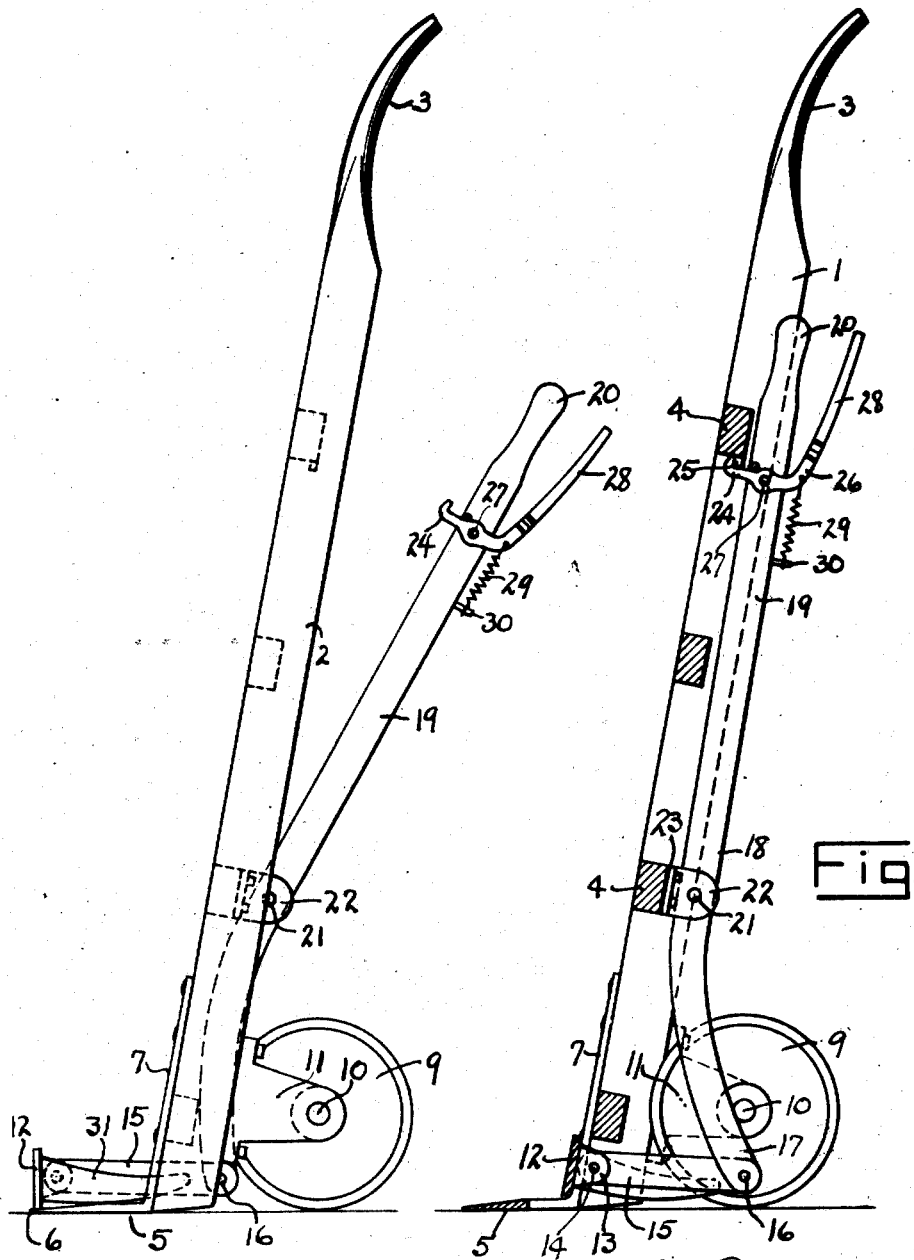

April 30, 1929. W. L. PHILLIPS 1,710,893
UNLOADING ATTACHMENT FOR HAND TRUCKS
Filed Jan. 13, 1928 2 Sheets-Sheet 2

Inventor
William Lee Phillips

By Jesse R. Stone
Attorney

Patented Apr. 30, 1929.

1,710,893

UNITED STATES PATENT OFFICE.

WILLIAM LEE PHILLIPS, OF HOUSTON, TEXAS.

UNLOADING ATTACHMENT FOR HAND TRUCKS.

Application filed January 13, 1928. Serial No. 246,480.

My invention relates to trucks employed in conveying loads from place to place about a building or platform, and particularly hand-operated trucks. It has application particularly to the unloading of loads from trucks of this character.

The usual hand truck comprises a frame or platform which has at the lower or forward end a supporting plate or flange which is adapted to be inserted beneath a box, barrel or other similar load after which the load is raised through the inclination of the load to rest upon the platform or frame and the flange so as to be wheeled to some other position. When the load is to be discharged from the truck, it is usually difficult to remove the supporting plate or flange from beneath the load without the throwing of the load with some force so that it will be discharged from the truck. This is sometimes difficult to accomplish, and furthermore, where the goods are liable to breakage, it is to be avoided.

It is an object of my invention to provide a means in connection with a truck of this character whereby the load may be discharged from the truck without difficulty and without throwing or endangering the safety of the cargo discharged, and which will assist in the rapid transporting of the loads from place to place.

It is also an object to provide an unloading device of this character which is easily operated and which is out of the way when not in use, and which is particularly strong and substantial and not liable to get out of order.

Referring to the drawing herewith, Fig. 1 is a central vertical section taken on the line 1—1 of Fig. 3. Fig. 2 is a side elevation of the truck with my attachment thereon, the unloading device being shown in discharging position. Fig. 3 is a front elevation of the truck with one handle broken away. Fig. 4 is a broken detail illustrating the forward end of the discharge device constituting my invention.

I have illustrated in the drawings an ordinary type of hand-operated truck. It is to be understood that my device is adapted for use with any ordinary truck of this general character and is not confined to this particular construction of the truck itself. The truck which I show has two longitudinal side members 1 and 2 with handles 3 at the upper end thereof for use by the operator in wheeling the truck. These two side framing members are connected at spaced intervals by cross bars 4, serving to space the two side members rigidly apart and forming with the side members a rigid frame.

The forward ends of the side frame members are connected together by a supporting plate. Said plate 5 is preferably of rigid metal, the forward end being tapered to a blunt edge, as shown at 6, in Figs. 1 and 2. The plate is of a length equal to the width of the truck frame and has at its ends upwardly inclined attaching arms 7 thereon, which may be secured rigidly to the frame members 1 and 2 by bolts or pins 8.

The frame thus constructed is provided with wheels 9 of substantial construction supported upon the shaft 10, secured in a bearing box 11 at each side of the frame. The wheels 9, as shown in Fig. 3, are preferably mounted upon the shaft or pin 10 at points spaced somewhat inwardly from the two side frame members 1 and 2.

The unloading device which forms the subject of my invention comprises a cross plate 12 shaped to rest upon the arms 7 of the supporting plate 5 closely adjacent the side members 1 and 2. When the load is placed upon supporting plate 6 it will rest also against the forward face of the plate 12. This plate extends slightly short of the width of the truck and has on its rearward side a pair of rearwardly extending ears. These ears have openings to receive a pin 14 by means of which pivotal connection is made with the link 15, which extends rearwardly and is connected at 16 to the lower arm 17 of a lever 18.

The lever 18 has a straight upper arm 19 with a handle 20 thereon for operation. It is pivoted at 21 upon ears 22 secured upon a plate 23 upon the cross bar 4. Below this pivotal point the lever is curved rearwardly so as to engage with the link 15, as previously noted.

The upper end of the lever is adapted to be latched normally in position, lying against the frame by means of a latching arm 24 hooked to engage about a small plate 25, upon the upper cross member 4. The latch member 24 is formed upon a bell crank lever 26 pivoted at 27 to the lever arm 19 and having an upwardly extending arm 28 whereby the latch may be manipulated. A spring 29 connected with the lever 26 is secured to a staple 30 upon the lever arm 19 and tends to hold the hooked end 24 in engagement with the plate 25 upon the truck frame. It will be noted that this latch may be disengaged by pushing forwardly upon the arm 28 of the lever, after which the lever arm 19 may be swung rearwardly, throwing the link 15 and the plate 12 connected therewith forwardly so as to remove the load from the truck.

The plate 12 is guided at its ends by arcuate arms 31 at each end of said plate. These arms are formed rigidly upon the plate and are adapted to normally rest upon the upper portion of the plate 5. They serve when the plate 12 is projected forwardly to act as a guide to prevent tipping or wabbling to guide it in its movement directly forward to remove the load from the supporting plate 5.

The operation of my device has been described. The load which is engaged upon the lower plate 5 and rests against the supporting frame may be wheeled from one position to another, and when it is desired to discharge the same, the lever 20 may be drawn toward the operator so as to shove the unloading plate 12 forwardly. This will act to either push the truck away from the load or to push the load away from the truck, and if it happens that the load is a particularly heavy one, the operation will usually be to force the truck rearwardly away from the load, leaving it resting upon the supporting floor or platform. The operation will be obvious to those skilled in the art.

This type of truck will enable the operator to handle loads much more rapidly, in that there will be no difficulty in discharging the load from the truck and boxes containing fragile material may be handled without danger of breaking, due to the difficulty of unloading from the ordinary truck, it being possible with my device to remove the truck from beneath the load with no difficulty.

The objects and advantages of the device will be obvious to those skilled in the art.

What I claim as new is:

1. A hand truck comprising a frame, handles at one end thereof, wheels adjacent the other end thereof, a load supporting plate on said frame opposite said wheels, a movable plate on said frame adjacent said load-supporting plate, a lever pivoted on said frame and connected at its lower end with said movable plate, and means including a spring latch for locking said lever with said movable plate normally against said frame.

2. A hand truck comprising a frame, handles at one end thereof, wheels adjacent the other end thereof, a load supporting plate on said frame opposite said wheels, a movable plate on said frame adjacent said load supporting plate, a lever pivoted on said frame and connected at its lower end with said movable plate, means locking said lever with said movable plate normally against said frame, and guides on said movable plate bearing on said frame and supporting plate to hold said movable plate in parallel relation with said frame and said supporting plate.

In testimony whereof I hereunto affix my signature this 10th day of January, A. D. 1928.

WILLIAM LEE PHILLIPS.